United States Patent
Ishizu et al.

(10) Patent No.: US 6,729,354 B2
(45) Date of Patent: May 4, 2004

(54) DOUBLE-PIPE-STRUCTURE HOLLOW MEMBER, METHOD OF MANUFACTURING DOUBLE-PIPE-STRUCTURE HOLLOW MEMBER, AND FLUID TREATING SYSTEM EMPLOYING DOUBLE-PIPE-STRUCTURE HOLLOW MEMBER

(75) Inventors: Seiji Ishizu, Toyota (JP); Kazushi Wakide, Toyota (JP); Yasuhiro Nobata, Toyota (JP); Akiyoshi Yamamoto, Toyota (JP); Suekichi Hangeishi, Toyota (JP); Mamoru Yashima, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 128 days.

(21) Appl. No.: 09/941,870

(22) Filed: Aug. 30, 2001

(65) Prior Publication Data

US 2002/0096225 A1 Jul. 25, 2002

(30) Foreign Application Priority Data

Jan. 19, 2001 (JP) ........................................ 2001-011728

(51) Int. Cl.[7] .................................................. F16L 9/02
(52) U.S. Cl. ........................ 138/109; 138/114; 138/141; 138/143; 422/181
(58) Field of Search ................. 138/114, 141, 138/109, 137, 143; 422/181

(56) References Cited

U.S. PATENT DOCUMENTS

| 4,124,357 | A | * | 11/1978 | Akimoto et al. | ............ | 422/181 |
|---|---|---|---|---|---|---|
| 4,357,745 | A | * | 11/1982 | Chlebowski | ................. | 138/141 |
| 4,775,518 | A | * | 10/1988 | Abthoff et al. | .............. | 422/179 |
| 5,363,544 | A | * | 11/1994 | Wells et al. | ................. | 138/114 |
| 5,600,752 | A | * | 2/1997 | Lopatinsky | .................. | 138/114 |
| 5,699,835 | A | * | 12/1997 | Nakagawa et al. | ......... | 138/141 |
| 5,937,516 | A | | 8/1999 | De Sousa et al. | | |
| 5,971,035 | A | * | 10/1999 | Griffioen | ..................... | 138/155 |
| 6,216,743 | B1 | * | 4/2001 | Kosaki et al. | .............. | 138/109 |

FOREIGN PATENT DOCUMENTS

| JP | A 04-190919 | 7/1992 |
|---|---|---|
| JP | A 06-101465 | 4/1994 |
| JP | A 10-280953 | 10/1998 |
| JP | B 2957176 | 7/1999 |
| JP | P 11-270335 | 10/1999 |
| JP | A 11-336537 | 12/1999 |
| JP | A 2000-073751 | 3/2000 |
| JP | A 2000-094050 | 4/2000 |

* cited by examiner

Primary Examiner—James Hook
(74) Attorney, Agent, or Firm—Kenyon & Kenyon

(57) ABSTRACT

A catalyst container of a catalytic converter is of a double-pipe structure wherein an outer periphery of an inner pipe and an inner periphery of an outer pipe are fittingly superposed on each other. The catalyst container has a catalyst installing portion, tapered cone portions extending from the catalyst installing portion with a gradually decreasing diameter, and straight connecting portions extending from smallest-diameter regions of the cone portions to the ends to be connected with connecting pipes upstream and downstream of the catalytic converter. Holes maybe formed in the cone portions of one of the inner or outer pipes to permit fluids to be displaced from the space therebetween. Such a catalyst container has sufficient rigidity and radiated noise suppression properties and thus can be reduced in weight by being thinned.

9 Claims, 7 Drawing Sheets

DOUBLE-PIPE-STRUCTURE HOLLOW MEMBER, METHOD OF MANUFACTURING DOUBLE-PIPE-STRUCTURE HOLLOW MEMBER, AND FLUID TREATING SYSTEM EMPLOYING DOUBLE-PIPE-STRUCTURE HOLLOW MEMBER

INCORPORATION BY REFERENCE

BACKGROUND OF THE INVENTION

1. Field of the Invention

The invention relates to a double-pipe-structure hollow member, a method of manufacturing a double-pipe-structure hollow member, and a fluid treating system employing a double-pipe-structure hollow member. More specifically, the invention relates to a double-pipe-structure hollow member composed of an inner pipe and an outer pipe, a method of manufacturing such a double-pipe-structure hollow member, and a fluid treating system that employs a double-pipe-structure hollow member composed of an inner pipe and an outer pipe as a fluid-treating-member container and that holds a fluid treating member inside the fluid-treating-member container.

2. Description of Related Art

A catalytic converter is provided in an exhaust system of a combustion system such as an internal combustion engine to remove noxious substances from exhaust gas flowing therethrough as fluid. In general, as shown in FIG. 9, a catalytic converter has a catalyst 102 as a fluid treating member provided via a mat 103 inside a catalyst container 101, which is a hollow member through which exhaust gas flows. The catalyst container 101 has a catalyst installing portion 101a formed at a central portion thereof and cylindrical connecting portions 101c formed at both ends thereof. The connecting portions 101c are connected with an inflow pipe extending from an internal combustion engine and an outflow pipe extending to a post-treatment portion such as a muffler. While the catalyst installing portion 101a has a relatively large diameter, the connecting portions 101c have a relatively small diameter. Tapered cone portions 101b with a gradually decreasing diameter are formed between the catalyst installing portion 101a having the relatively large diameter and the connecting portions 101c having the relatively small diameter.

As is disclosed e.g. in Japanese Patent Application Laid-Open No. 11-336537, Japanese Patent Application Laid-Open No. 2000-94050, or Japanese Patent Application Laid-Open No. 6-101465, it has been known to provide a catalyst container of such a catalytic converter with a double-pipe structure for the purpose of maintaining the catalyst at a certain temperature and improving exhaust-gas purification performance. As is also disclosed in Japanese Patent Application Laid-Open No. 11-336537, a double-pipe-structure catalyst container generally has a construction wherein an inner pipe and an outer pipe are disposed concentrically with a radial air gap left therebetween.

Japanese Patent Application Laid-Open No. 11-336537 discloses an exhaust-system component composed of an inner pipe having substantially tapered reduced-diameter portions at both ends thereof and an outer pipe having substantially tapered reduced diameter portions at both ends thereof and covering the inner pipe along its entire length including the reduced-diameter portions at both the ends with an air gap left therebetween, characterized in that at least one of the reduced-diameter portions of the outer pipe is formed by spinning.

Further, this publication discloses a method of manufacturing an exhaust-system component characterized by comprising the steps of covering an inner pipe having substantially tapered reduced-diameter portions at both ends thereof with an outer pipe while maintaining an air gap therebetween, and spinning at least one end of the outer pipe to reduce its diameter in a substantially tapered manner. On the other hand, in order to ensure formation of the air gap, some double-pipe-structure catalyst containers of the related art have wire meshes 115 provided between an inner pipe 111 and an outer pipe 112 as shown in FIG. 10 or a bead formed therebetween.

Japanese Patent Application Laid-Open No. 6-101465 discloses a double-pipe catalytic converter characterized in that a catalyst casing (container) has a double-pipe structure composed of a first casing and a second casing to suppress a fall in temperature of the catalyst in a low-speed low-load range of an internal combustion engine, that an opening is provided in a most upstream portion in a casing gap between the first and second casings so that the casing gap communicates with an exhaust passage, that the catalyst is divided into a first catalyst and a second catalyst, that a hole for communication between the casing gap with a catalyst gap between the first and second catalysts is provided, and that an on-off valve is provided in the hole or the opening in the most upstream portion in the casing gap.

Further, in order to easily and inexpensively manufacture a double-structure container composed of an inner pipe and an outer pipe that have a predetermined gap therebetween and that have an integrally deformed cross-section, Japanese Patent Application Laid-Open No. 2000-94050 discloses a method of manufacturing a double-pipe-structure container characterized by comprising the steps of disposing an inner pipe inside an outer pipe while leaving a certain air gap therebetween and spinning the outer pipe with a solid interjacent material sandwiched in at least one axial section in the air gap to simultaneously deform cross-sections of the inner and outer pipes. In addition, this publication also discloses a construction wherein resonance holes are formed in the inner pipe in advance so that exhaust noise flows into an air gap of a resonance-type muffler section of a formed product through the resonance holes and that the air gap serves as a resonance space for causing a sound-deadening effect. Still further, as is also disclosed in this publication, a double-pipe-structure catalyst container of the related art has an inner pipe and an outer pipe that are fixed at one end thereof to other connecting pipes but that clamp at the other end thereof a wire-net ring for relatively displaceably holding the inner and outer pipes, so that relative displacement resulting from a difference in thermal expansion between the inner and outer pipes can be guaranteed.

Exhaust gas discharged from an internal combustion engine is at a high temperature and is introduced into a catalytic converter at a high flow rate while pulsating in accordance with combustion of the internal combustion engine. In the case where the catalyst container has a small thickness, since pulsating exhaust gas is introduced thereinto at a high flow rate, so-called radiation noise is generated especially due to vibrations of upstream cone portions connected with the internal combustion engine. To abate this radiation noise, it is contemplable to increase the characteristic frequency of the catalyst container. Further, the catalyst container is exposed to a high temperature and corroded through oxidization, and thus is required to demonstrate high temperature- and corrosion-resistance.

However, in the case of a single-pipe-structure catalyst container employing a hollow member according to the related art as described above, even though a thickness of e.g. 1 mm suffices for temperature- and corrosion-resistance and required rigidity for holding the catalyst, there is a problem of the necessity to set a thickness greater than the required thickness, e.g. 1.5 mm, for the purpose of increasing the characteristic frequency and guaranteeing high temperature- and corrosion-resistance with the intention of suppressing radiation noise. In the case of a double-pipe-structure catalyst container as described above, since the inner and outer pipes are independent from each other owing to an air gap formed therebetween, there is also a problem of the necessity to set a thickness greater than the required thickness in order to ensure sufficient rigidity, as is the case with the single-pipe-structure catalyst container.

Whether the catalyst container of the related art has a single-pipe structure or a double-pipe structure, there is a problem of the necessity to increase the overall thickness. This causes problems such as an increased amount of use of materials and inability to reduce the overall weight.

SUMMARY OF THE INVENTION

The invention has been made in view of the aforementioned problems. It is an object of the invention to provide a double-pipe-structure hollow member capable of maintaining the same rigidity as in the related art, achieving reduction in weight through a reduced thickness and being easily manufactured in a small number of steps, and a method of manufacturing such a double-pipe-structure hollow member. It is another object of the invention to provide a fluid treating system employing a double-pipe-structure hollow member capable of achieving reduction in weight through reduction in thickness of a double-pipe-structure hollow member employed in the fluid treating system.

The objects are achieved by a double-pipe-structure hollow member, a method of manufacturing a double-pipe-structure hollow member, and a fluid treating system employing a double-pipe-structure hollow member as described below.

A double-pipe-structure hollow member is composed of an inner pipe and an outer pipe that are concentrically superposed on each other such that an outer periphery of the inner pipe and an inner periphery of the outer pipe are in contact with each other. By spinning the concentrically disposed inner and outer pipes, a double-pipe-structure hollow member with the outer periphery of the inner pipe and the inner periphery of the outer pipe superposed on each other is manufactured. The double-pipe-structure hollow member thus manufactured is employed as a container for a fluid treating member, thus constituting a fluid treating system.

In such a double-pipe-structure hollow member wherein the inner and outer pipes are disposed concentrically to be spun, the inner and outer pipes are concentrically disposed and superposed on each other such that the outer periphery of the inner pipe and the inner periphery of the outer pipe are in contact with each other. Therefore, it is possible to obtain the same rigidity as of a hollow member of a thickness equal to or greater than the sum of the thickness of the inner pipe and the thickness of the outer pipe. Thus, the entire double-pipe-structure hollow member can be reduced in thickness and weight.

By employing the double-pipe-structure hollow member as a container for a fluid treating member and thus constituting a fluid treating system, the entire fluid treating system can be reduced in weight.

BRIEF DESCRIPTION OF THE DRAWINGS

The above-mentioned and other objects, features, advantages, technical and industrial significance of this invention will be better understood by reading the following detailed description of preferred embodiments of the invention, when considered in connection with the accompanying drawings, in which:

FIG. 3b is an enlarged cross-sectional view illustrating how the inner and outer pipes of the invention are coherently superposed on each other and shows a state where the forming roller has been axially displaced to the left from the state shown in FIG. 3a;

DETAILED DESCRIPTION OF PREFERRED EMBODIMENTS

Figure 1:
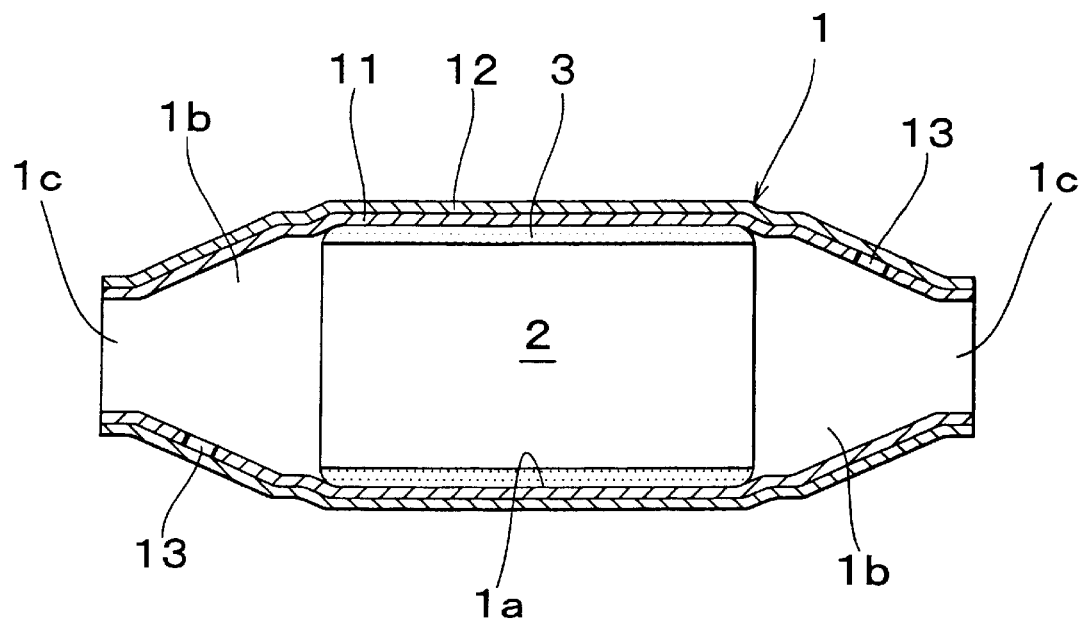
FIG. 1 is a cross-sectional view of a catalytic converter employing a double-pipe-structure member according to one embodiment of the invention.

In the following description and the accompanying drawings, the invention will be described in more detail with reference to exemplary, preferred embodiments.

First of all, a fluid system employing a double-pipe-structure hollow member according to one embodiment of the invention will be described in detail with reference to FIG. 1, which shows a catalytic converter holding a catalyst 2 as a fluid treating member in a catalyst container 1 as a fluid treating member container constructed of a double-pipe-structure hollow member.

The catalyst container 1 of the catalytic converter of the first embodiment has a double-pipe structure wherein an outer periphery of an inner pipe 11 and an inner periphery of an outer pipe 12 are substantially, entirely or partially superposed on each other. The catalyst container 1 has a catalyst installing portion 1a having a relatively large diameter to install the catalyst 2 disposed substantially at the longitudinal center of the catalyst container 1, tapered cone portions 1b extending from both ends of the catalyst installing portion 1a with a gradually decreasing diameter, and straight connecting portions 1c further extending from smallest-diameter sections of the cone portions 1b to the ends of the catalyst container 1 to be connected respectively with connecting pipes (not shown) upstream and downstream of the catalytic converter. In this embodiment, holes 13 are formed in the cone portions 1b of the inner pipe 11. The catalyst 2 is disposed via a mat 3 and has a slightly reduced diameter at both ends thereof, whereby the catalyst installing portion 1a immovably holds the catalyst 2.

Note that the double-pipe structure wherein the inner pipe 11 and the outer pipe 12 are concentrically superposed on each other so that the outer periphery of the inner pipe 11 and the inner periphery of the outer pipe 12 are in contact with each other means a structure wherein a cross-sectional shape of at least one of the inner and outer pipes 11, 12 is partially or entirely deformed while the inner and outer pipes 11, 12 are fitted to each other with their central axes coinciding with each other so that the outer periphery of the inner pipe 11 and the inner periphery of the outer pipe 12 may be separated from each other but are coherently superposed on each other with no substantial gap left therebetween. The holes 13 allow air to flow between the inside of the catalyst container 1 (in the case shown in FIG. 1 where the holes 13 are formed in the inner pipe 11) or the outside of the catalyst container 1 (in the case where the holes 13 are formed in the outer pipe 12 and not shown in any of the drawings) and the outer periphery of the inner pipe 11 and the inner periphery of the outer pipe 12 when the outer periphery of the inner pipe 11 and the inner periphery of the outer pipe 12 are brought into or out of contact with each other. The holes 13 have such a dimension that fluid flowing through the double-pipe-structure hollow member is unlikely to flow into a gap between the outer periphery of the inner pipe 11 and the inner periphery of the outer pipe 12. Note that the fluid flowing through the double-pipe-structure hollow member may not necessarily be air and may be another gas or liquid.

Next, as described above, a machine for spinning the inner and outer pipes 11, 12 to form the catalyst container 1 composed of the concentrically superposed inner and outer pipes 11, 12 as the double-pipe-structure hollow member employed in the fluid treating system of the invention will be described with reference to FIG. 6.

The spinning machine shown in FIG. 6 has a forming roller 20 for simultaneously reducing diameters of the inner and outer pipes 11, 12 through abutment on the outer pipe 12, a holding means 21 for holding the inner and outer pipes 11, 12, a revolutionarily driving means 22 for revolutionarily driving the forming roller 20 with respect to the inner and outer pipes 11, 12 held by the holding means 21 (hereinafter referred to also as a chuck), a revolving diameter changing means 23 for changing a revolving diameter of the forming roller 20, and an axially displacing means 24 for displacing the inner and outer pipes 11, 12 held by the holding means 21 with respect to the forming roller 20 along its axis of revolution. Furthermore, an offset preventing means 25 for preventing axial offset of the inner and outer pipes 11, 12 is provided in this embodiment.

Figure 6:
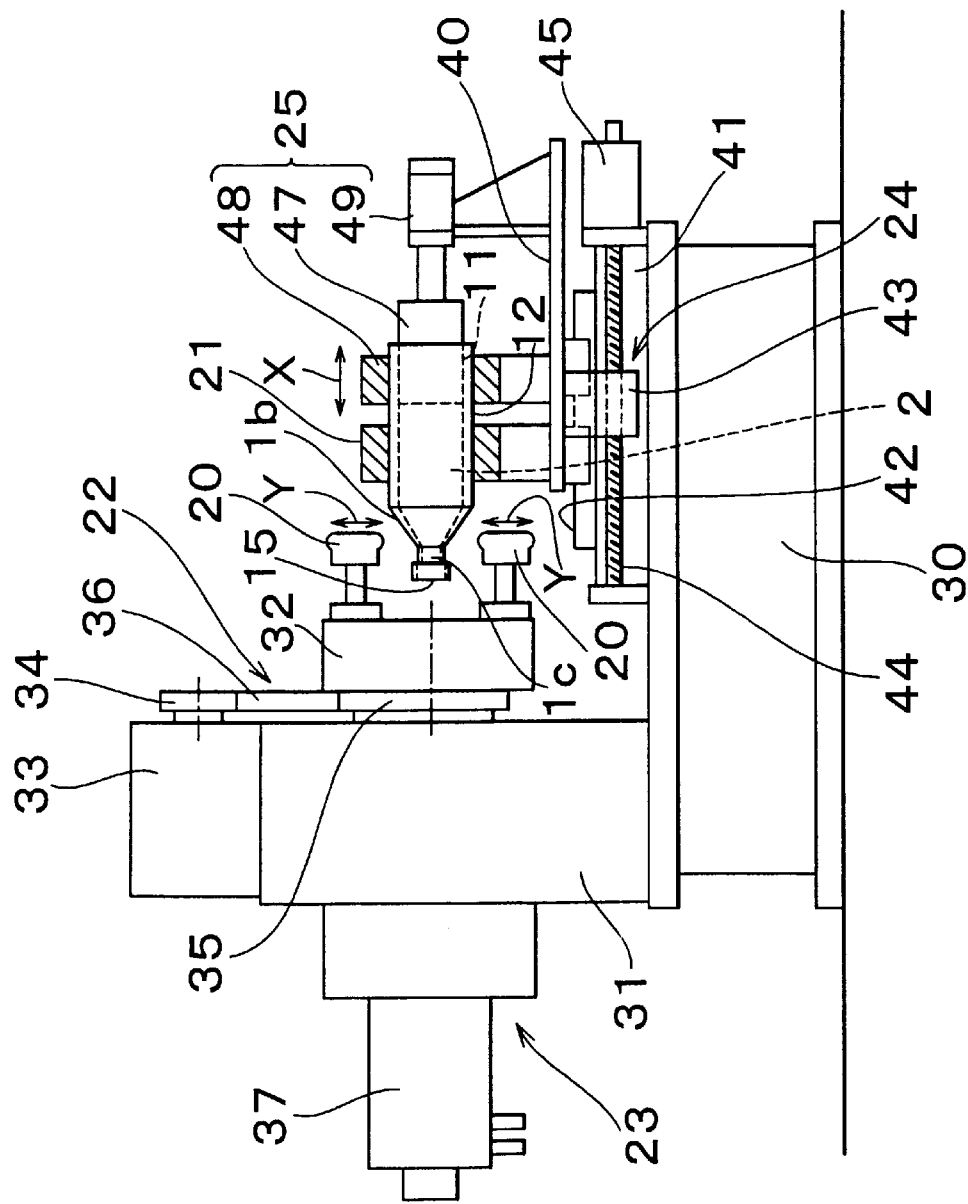
FIG. 6 is a front view of a spinning machine used to manufacture a double-pipe-structure hollow member according to one embodiment of the invention.

A spindle bearing stand 31 is provided on one side of a base 30 (on the left side in FIG. 6). A spindle 32 is rotatably supported by the spindle bearing stand 31. A pair of forming rollers 20, 20 are supported on a front end face of the spindle 32 (the right end face shown in FIG. 6) radially movably with respect to the spindle 32. A spindle driving motor 33 is provided on the spindle bearing stand 31. A pulley 34 provided on a rotational shaft of the spindle driving motor 33 and a pulley 35 provided on the spindle 32 are connected by a wrapping transmission means 36 such as a V-belt. Further, a forming roller on-off motor 37 for changing a revolving diameter of the forming rollers 20, 20 radially movably supported by the spindle 32 (see an arrow Y shown in FIG. 6) is provided on a rear face of the spindle bearing stand 31.

A supporting stand 41 for guiding and supporting an axial displacement board 40 is provided on the other side of the base 30 (on the right side in FIG. 6). A rail 42 for guiding displacement of the axial displacement board 40 is provided on the supporting stand 41. A ball screw nut 43 provided on a lower face of the axial displacement board 40 is screwed onto a ball screw shaft 44. A delivery motor 45 for controlling the ball screw shaft 44 in such a manner as to rotate around its axis is provided. The chuck 21 as a holding means for concentrically holding the inner and outer pipes 11, 12 that are fitted to each other and the offset preventing means 25 are provided on an upper face of the axial displacement board 40. The offset preventing means 25 is composed of a guide 47 fitted into the inner pipe 11, a clamp 48 for uniformly pressing a periphery of the guide 47 via the inner and outer pipes 11, 12, and a guide-insertion actuator 49 for inserting the guide 47 into the inner pipe 11 and retracting the guide 47 from the inner pipe 11.

In this embodiment, the forming roller 20 is disposed such that the revolution axis of the forming roller 20 (i.e., the rotational axis of the spindle 32) is concentric with the central axes of the inner and outer pipes 11, 12 held by the chuck 21 and the offset preventing means 25. However, if occasion demands, the forming roller 20 may be disposed such that the revolution axis of the forming roller 20 is offset from the central axes of the inner and outer pipes 11, 12 in parallel therewith or that the revolution axis of the forming roller 20 and the central axes of the inner and outer pipes 11, 12 are eccentric with each other so as to form such a predetermined angle that their elongations intersect with each other. The guide 47 may be provided with a flange (not shown) protruding from a middle position of its outer periphery and abutting on end faces (an end face) of the outer pipe 12 and/or the inner pipe 11 so as to prevent axial offset of the inner and outer pipes 11, 12 from each other.

In the spinning machine constructed as described above, the inner and outer pipes 11, 12 are concentrically held by the chuck 21 while being fitted to each other. If the guide 47 has been inserted into the inner pipe 11 by being driven by the guide-insertion actuator 49, the end face of the catalyst 2 held in the inner pipe 11 is pressed so that the inner and outer pipes 11, 12 are held at predetermined positions. By uniformly pressing the periphery of the guide 47 by means of the clamp 48, the inner and outer pipes 11, 12 are gripped while being prevented from being axially offset from each other.

On the other hand, if the spindle driving motor 33 has been rotationally driven, the spindle 32 is rotationally driven at a speed reduced at a predetermined rate via the pulley 34, the wrapping transmission means 36 and the pulley 35, and the forming roller 20 supported by the spindle 32 is revolved. If the delivery motor 45 has been driven to rotate the ball screw shaft 44 around its axis in this state, the axial displacement board 40 with the ball screw nut 43 screwed onto the ball screw shaft 44 moves along the rail 42 in the longitudinal direction of the inner and outer pipes 11, 12, so that the inner and outer pipes 11, 12 held by the chuck 21 axially move toward or away from the revolving forming roller 20. By driving the forming roller on-off motor 37, the revolving diameter of the forming roller 20 is changed. Then the forming roller 20 spins the inner and outer pipes 11, 12 into a predetermined shape while simultaneously reducing their diameters. The longitudinal displacement of the inner and outer pipes 11, 12 per revolution of the forming roller 20 and the rotational speed of the spindle 32 are set such that spinning can be performed without cracking those positions of the inner and outer pipes 11, 12 which are to be used as a product and that formation of the predetermined shape is completed within a shortest possible period.

Next, a method of manufacturing the double-pipe-structure hollow member 1 employed in the catalyst container of the catalytic converter constructed as described above according to the invention will be described in detail with reference to FIGS. 2 to 5 and FIG. 1, based on the case where the above spinning machine is used to fittingly superpose the outer periphery of the inner pipe 11 and the inner periphery of the outer pipe 12 on each other and where air is an interjacent medium between the inner and outer pipes 11, 12.

On the whole, in the method of manufacturing the double-pipe-structure hollow member 1 according to the invention, the holes 13 are formed in one of the inner and outer pipes 11, 12 so that air between the inner and outer pipes 11, 12 can flow to the outside after completion of superposition, and then, the inner and outer pipes 11, 12 are concentrically disposed and spun so that the outer periphery of the inner pipe 11 and the inner periphery of the outer pipe 12 are fittingly superposed on each other.

Figure 2:
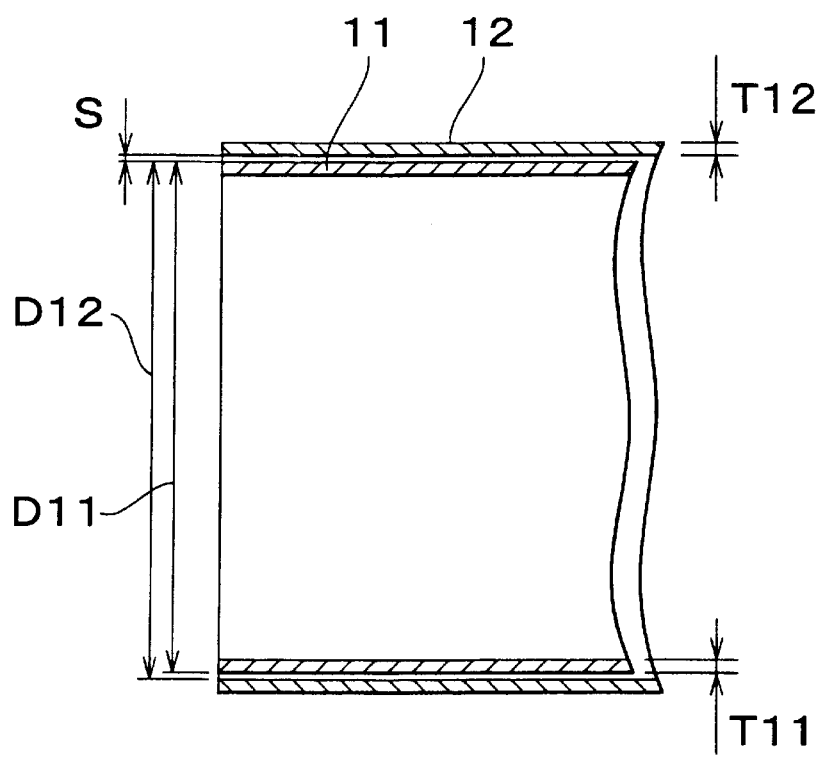
FIG. 2 is an enlarged partial cross-sectional view of inner and outer pipes in their unformed states.

In manufacturing the catalytic converter, first of all, the inner and outer pipes 11, 12 fitted to each other are prepared. As shown in FIG. 2, the prepared inner and outer pipes 11, 12 have straight cross-sectional shapes before being superposed on each other so that the difference D12−D11 between an inner diameter D12 of the outer pipe 12 and an outer diameter D11 of the inner pipe 11 is e.g. 0.5 mm, i.e., that the fitting distance between the inner and outer pipes 11, 12 (a gap S between the outer periphery of the inner pipe 11 and the inner periphery of the outer pipe 12) is 0.25 mm. The inner pipe 11 has a thickness T11 of e.g. 0.5 mm and the outer pipe 12 has a thickness T12 of e.g. 0.5 mm. That is, the thickness T11 and the thickness T12 are set such that the sum thereof is equal to 1.0 mm when the inner and outer pipes 11, 12 are superposed on each other. In this embodiment, the holes 13 of a predetermined size are formed in those portions of the inner pipe 11 which are to be the cone portions. Each of longitudinal dimensions of the inner and outer pipes 11, 12 is set in accordance with a length extended by draw forming resulting from spinning.

The inner and outer pipes 11, 12 thus formed are fitted to each other, whereby the central axes of the inner and outer pipes 11, 12 are disposed concentrically. The catalyst 2 is held via the mat 3 in the catalyst installing portion 1a disposed in the inner pipe 11 substantially at the longitudinal center thereof. In this state, the inner and outer pipes 11, 12 are inserted through the chuck 21 and the clamp 48. The guide-insertion actuator 49 is driven to insert the guide 47 into the inner pipe 11 at its opposite end that is not spun. The catalyst 2 is pressed to a predetermined position by a leading end face of the guide 47 and thus axially positioned with respect to the forming roller 20. Afterwards, the longitudinally central portion where the catalyst 2 is disposed is held by the chuck 21 and the end into which the guide 47 has been inserted is uniformly pressed onto the periphery of the guide 47 by means of the clamp 48, so that the inner and outer pipes 11, 12 are gripped while being prevented from being axially offset from each other.

Figure 3A:
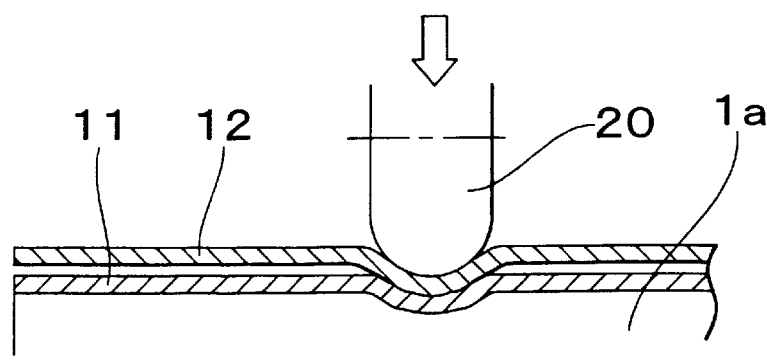
FIG. 3a is an enlarged cross-sectional view illustrating how the inner and outer pipes of the invention are coherently superposed on each other and shows a state where a forming roller has just begun to press the pipes.
Figure 3B:
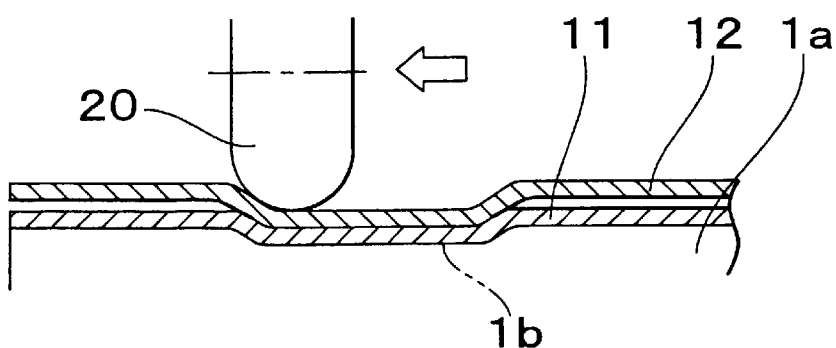
Figure 3C:
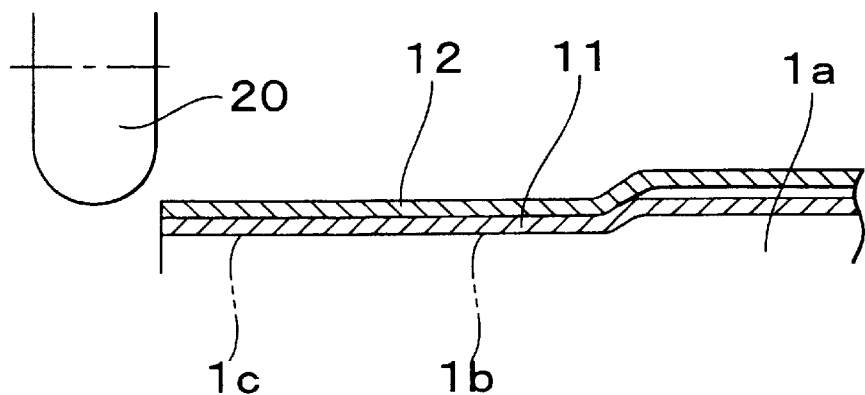
FIG. 3c is an enlarged cross-sectional view illustrating how the inner and outer pipes of the invention are coherently superposed on each other and shows a state where the forming roller has been further displaced to the left and passed ends of the inner and outer pipes.

Next, the delivery motor 45 is driven to rotate the ball screw shaft 44 around its axis and displace the axial displacement board 40 with the ball screw nut 43 screwed onto the ball screw shaft 44 along the rail 42 in the longitudinal direction of the inner and outer pipes 11, 12 so that the inner and outer pipes 11, 12 are displaced toward the forming roller 20 until they reach boundary positions between those portions which are to be the catalyst installing portion 1a and the cone portions 1b in the case of this embodiment. Then the spindle driving motor 33 is rotationally driven so that the spindle 32 is rotationally driven and that the forming roller 20 supported by the spindle 32 is revolved. The revolving diameter of the forming roller 20 is changed by driving the forming roller on-off motor 37 so that the forming roller 20 is pressed against the outer pipe 12 and also against the inner pipe 11 via the outer pipe 12 by a predetermined stroke as shown in FIG. 3a. Then as shown in FIG. 3b, the delivery motor 45 is driven to axially displace the axial displacement board 40 so that the inner and outer pipes 11, 12 are displaced with respect to the forming roller 20. If the axial displacement board 40 has been axially displaced so that the forming roller 20 relatively passes the ends of the inner and outer pipes 11, 12 as shown in FIG. 3c, the inner and outer pipes 11, 12 are deformed from the position of first abutment of the forming roller 20 to their ends, i.e., in those portions which are to be the cone portions 1b and the connecting portions 1c in such a manner that their cross-sectional shapes are reduced in size. Then the inner and outer pipes 11, 12 are substantially coherently superposed on each other.

Figure 4:
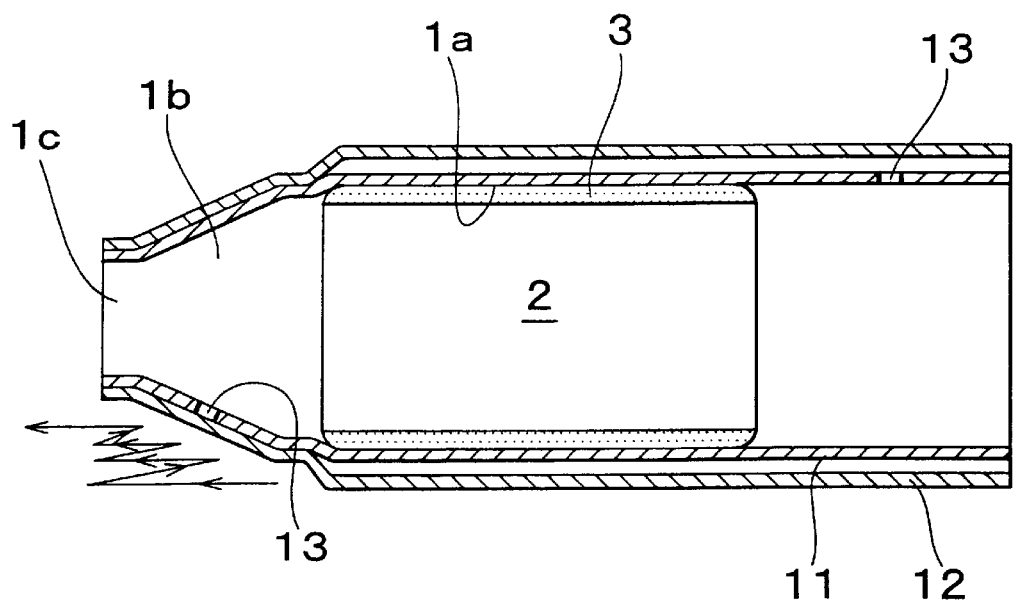
FIG. 4 is a cross-sectional view of a catalytic converter with a cone portion and a connecting portion formed at one en d of a catalyst container.

Then as shown in FIG. 4, reduction of the revolving diameter of the forming roller 20 and displacement of the axial displacement board 40 are carried out repeatedly, whereby those portions of the inner and outer pipes 11, 12 which have been coherently superposed on each other are spun at the same time in such a manner as to decrease in diameter. As a result, the cone portions 1b and the connecting portions 1c are formed. The holes 13 that have been formed in those portions which are to be the cone portions 1b are reduced in diameter by spinning and thus are reduced in size into the shape of small slits. Therefore, as will be described later, exhaust gas flowing through the catalytic converter is prevented from unexpectedly flowing into the gap between the inner and outer pipes 11, 12.

Figure 5:
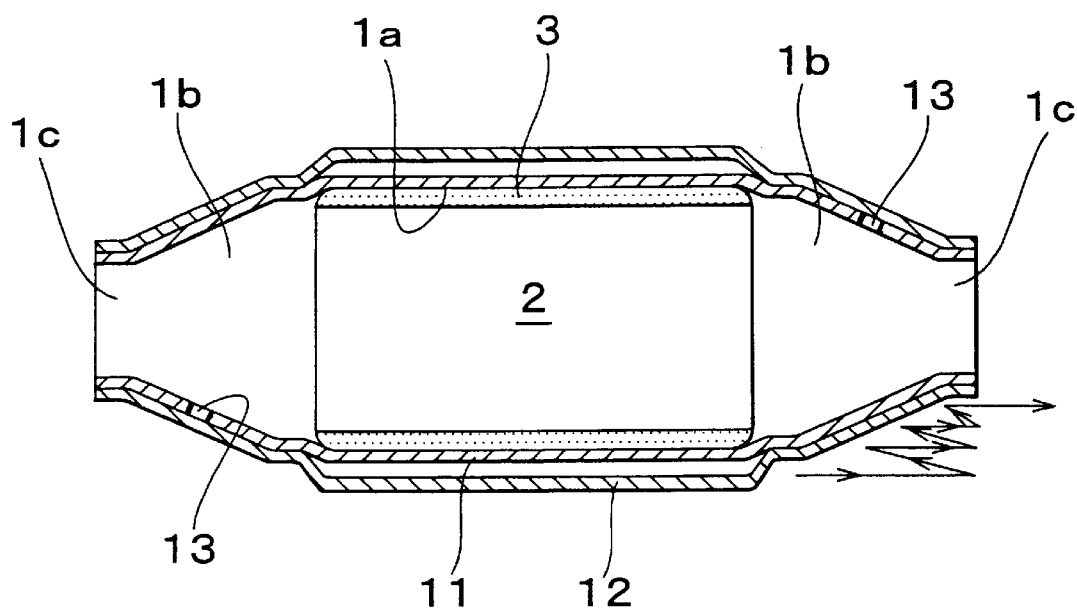
FIG. 5 is a cross-sectional view of a catalytic converter with a cone portion and a connecting portion formed also at the other end of the catalyst container.

If the cone portion 1b and the connecting portion 1c have been formed at one end of the inner and outer pipes 11, 12, the chuck 21 and the clamp 48 are opened and the guide 47 is retracted. To form the cone portion 1b and the connecting portion 1c at the other end, the inner and outer pipes 11, 12 are turned around and the actuator 49 is driven so that the end face of the connecting portion 1c is pressed by the leading end face of the guide 47, held in position, and gripped by the chuck 21. At this moment, since the cone portion 1b and the connecting portion 1c have already been formed at one end of the inner and outer pipes 11, 12, the inner and outer pipes 11, 12 are prevented from being axially offset from each other and thus do not require being gripped by the clamp 48. Subsequently, the other end of the inner and outer pipes 11, 12 is again spun in the same manner as one end thereof as described above. Thereby the catalyst 2 is held via the mat 3 in the catalyst installing portion 1a of the inner and outer pipes 11, 12, and the cone portions 1b and the connecting portions 1c are formed in the aforementioned close-fitted portions at both ends of the catalyst installing portion 1a as shown in FIG. 5. In forming the cone portions 1b and the connecting portions 1c at both ends of the catalyst installing portion 1a, the outer pipe 12 with a smaller thickness is reduced in diameter by being gripped by the chuck 21 twice substantially in such a manner as to come into close contact with the inner pipe 11.

Thus, in the embodiment shown in FIG. 1, a catalytic converter with the entire catalyst container 1 constructed of the double-pipe-structure hollow member 1 formed by fittingly superposing the outer periphery of the inner pipe 11 and the inner periphery of the outer pipe 12 on each other is manufactured. For example, while a connecting pipe (not shown) for connection with an exhaust manifold of an internal combustion engine is fitted into and welded to one of the connecting portions 1c where the inner and outer pipes 11, 12 are coherently superposed on each other, a connecting portion (not shown) for connection with a muffler is fitted into and welded to the other connecting portion 1c.

As shown in FIG. 5, the outer pipe 12 may not be reduced in diameter in such a manner as to come into close contact with the inner pipe 11 if the gripping force applied to the catalyst installing portion 1a by the chuck 21 or the rigidity of the outer pipe 12 assumes a certain value. In this case, although not shown in the drawings, a general-purpose spinning machine having a pair of chucks capable of gripping the connecting portions 1c at both ends of the catalytic converter, a driving means for rotationally driving at least one of the chucks around its axis, and the forming roller 20 displaceable axially and radially with respect to the catalyst installing portion 1a can be used. That is, the connecting portions 1c at both ends of the catalytic converter are gripped by the chucks and pressed by the forming roller 20 while being rotationally driven around their axes by the driving means, so that the outer pipe 12 of the catalyst installing portion 1a can be reduced in diameter in such a manner as to come into close contact with the inner pipe 11.

The catalytic converter thus manufactured has the connecting portions connected with e.g. an inflow pipe extending from an internal combustion engine and an outflow pipe extending to a post-treatment portion such as a muffler and removes noxious substances from exhaust gas flowing through the catalytic converter. The exhaust gas discharged from the internal combustion engine is at a high temperature and is introduced into the catalytic converter at a high flow rate while pulsating in accordance with combustion of the internal combustion engine. For this reason, radiation noise tends to be generated especially due to vibrations of the inner pipe 11 of the upstream cone portion 1b into which exhaust gas is introduced from the internal combustion engine. However, the catalytic converter manufactured based on the technical concept of the invention functions such that the outer pipe 12 coherently superposed on the inner pipe 11 counteracts vibrations of the inner pipe 11 of the cone portion 1b, and thus suppresses generation of radiation noise.

Further, since the inner and outer pipes 11, 12 are coherently superposed on each other, there is no substantial difference in thermal expansion. Even if there is a difference in thermal expansion, the outer periphery of the inner pipe 11 and the inner periphery of the outer pipe 12 are superposed on each other within an allowable separation range. Therefore, the double-pipe-structure hollow member is not deformed or damaged by a difference in thermal expansion between the inner and outer pipes 11, 12.

Furthermore, even if a small amount of air existing between the inner and outer pipes 11, 12 has been expanded or contracted owing to the heat of fluid flowing through the double-pipe-structure hollow member of the invention, the air can flow between the gap between the inner and outer pipes 11, 12 and the inside or outside of the double-pipe-structure hollow member 1 via the holes 13. Therefore, the double-pipe-structure hollow member of the invention is not deformed or damaged by expansion or contraction of air.

As described above, it is mainly because of vibrations of the cone portions 1b that pulsating exhaust gas flows from the internal combustion engine at a high flow rate and causes radiation noise. For this reason, a catalytic converter employing the double-pipe-structure hollow member of the invention as the catalyst container 1 needs to adopt a construction wherein the inner and outer pipes 11, 12 of the cone portions 1b are coherently superposed on each other. Further, since the inner and outer pipes 11, 12 of the connecting portions 1c need to be superposed on each other, because other connecting pipes are connected therewith and welded thereto. On the other hand, in order to provide the catalytic converter with an improved exhaust gas purification performance and so on, it is desirable that the catalyst 2 be held at a constant temperature. Thus, the catalytic converter of the invention may have a construction wherein the inner and outer pipes 11, 12 are spaced from each other in the catalyst installing portion 1a as shown in FIG. 5, instead of a construction wherein the outer pipe 12 of the catalyst installing portion 1a is reduced in diameter in such a manner as to come into close contact with the inner pipe 11. Namely, an air layer as an interjacent medium may be formed between the inner and outer pipes 11, 12 such that the air can expand or contract via the holes 13.

Further, the method of the invention is not limited to the case where the interjacent medium between the inner and outer pipes 11, 12 is air, but is also applicable to a case where trash such as swarf and spatter and other useless things that have been generated during cutting or welding processes performed in relation to other members to be connected with the double-pipe-structure hollow member and that are desirably to be removed exist between the inner and outer pipes 11, 12 or a case where the gap between the inner and outer pipes 11, 12 is filled with a predetermined amount of predetermined functional members such as a heat insulator, a buffer and a silencer. The holes 13 may be open if interposition of an interjacent medium is required or be closed by plugs or the like (not shown).

Figure 7:
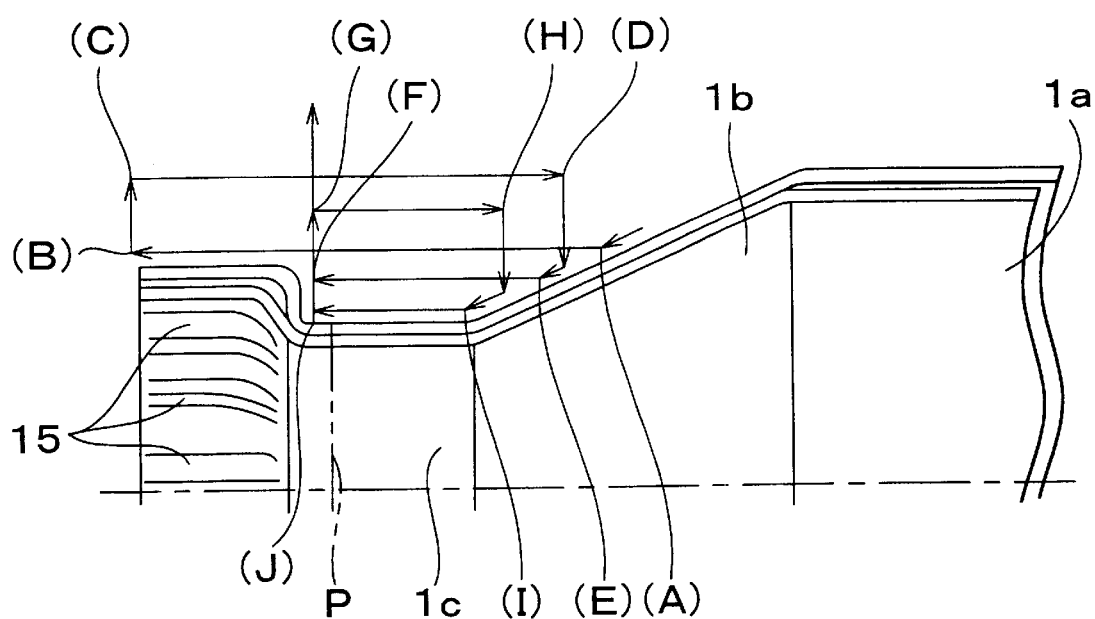
FIG. 7 is a partial cross-sectional view illustrating how to manufacture a double-pipe-structure hollow member according to a second embodiment of the invention.

Next, a method of manufacturing a double-pipe-structure hollow member according to a second embodiment of the invention will be described with reference to FIGS. 7, 8. In the second embodiment, components identical with or corresponding to those of the first embodiment will be described just briefly or will be denoted by the same reference numerals and not described in any further detail. The description of the second embodiment will be focused mainly on what is different from the first embodiment. FIG. 7 shows only that part of the catalyst container 1 which is above the central axis thereof. The catalyst 2 is not shown in FIG. 7.

On the whole, according to the manufacturing method of the invention, in the case where the superposed inner and outer pipes 11, 12 are changed in cross-sectional shape by being spun and thus formed into a predetermined shape, the inner and outer pipes 11, 12 are circumferentially buckled at their ends to form axially extending ribs 15, and then the ends including the ribs 15 are cut off to obtain the double-pipe-structure hollow member formed into a predetermined shape. The ends including the ribs 15 are cut off at a position indicated by an alternate long and two short dashes line P shown in FIG. 7.

In manufacturing a catalytic converter, the inner and outer pipes 11, 12 are prepared in consideration of a length extended by draw forming resulting from spinning and an axial length of the portions to be cut off. With the inner pipe 11 inserted into the outer pipe 12, these pipes are held in a predetermined position by the guide 47 of the above spinning machine and gripped by the chuck 21 and the clamp 48. Next, the axial displacement board 40 is displaced such that boundary portions between those portions of the inner and outer pipes 11, 12 which are to be the catalyst installing portion 1a and the cone portions 1b correspond to the forming roller 20. The forming roller 20 is revolved with its revolving diameter changed. The inner and outer pipes 11, 12 are axially displaced with respect to the forming roller 20 with the forming roller 20 pressed against the outer pipe 12 and also against the inner pipe 11 via the outer pipe 12 by a predetermined stroke as shown in FIGS. 3a, 3b and 3c. Thus, those portions of the inner and outer pipes 11, 12 which range from the cone portions 1b to the ends are deformed in cross-sectional shape in such a manner as to be reduced in size, and are substantially coherently superposed on each other.

Subsequently, reduction in revolving diameter of the forming roller 20 and axial displacement of the axial displacement board 40 are performed repeatedly, and those portions of the inner and outer pipes 11, 12 which have been coherently superposed on each other are gradually reduced in diameter simultaneously as far as a middle position of the cone portion 1b. Thereafter the forming roller 20 is relatively displaced to perform reduction in diameter straightly from the middle position to the leading end as indicated by (A) and (B) in FIG. 7. Then the forming roller 20 is retracted from the position (B) to a radially outside position (C), and is relatively displaced in parallel with the axis of the connecting portion 1c to a position (D) that is axially closer to the end than the position (A) by a predetermined distance. Then the forming roller 20 is radially inwardly displaced to press the inner and outer pipes 11, 12, and is relatively displaced toward the axial end to a position (E) along the incline of the tapered cone portion 1b to be formed in such a manner that the inner and outer pipes 11, 12 are reduced in diameter slightly and gradually. Thereafter the forming roller 20 is relatively axially displaced to a position (F) that is slightly closer to the end than the cut-off position P, with its revolving diameter unchanged.

Then the forming roller 20 is retracted from the position (F) to a radially outside position (G), and is relatively displaced in parallel with the axis of the connecting portion 1c to a position (H) that is axially closer to the end than the position (D) by a predetermined distance. The forming roller 20 is then radially inwardly displaced to press the inner and outer pipes 11, 12, and is relatively displaced along the incline of the tapered cone portion 1b to be formed and toward the axial end to a smallest-diameter position of the tapered cone portion 1b, i.e., to a boundary position (I) between the cone portion 1b and the connecting portion 1c in such a manner that the inner and outer pipes 11, 12 are reduced in diameter gradually. Thereafter the forming roller 20 is relatively axially displaced to a position (J) that is slightly closer to the end than the cut-off position P, with its revolving diameter unchanged. Then the forming roller 20 is radially outwardly retracted from the position (J).

Figure 8:
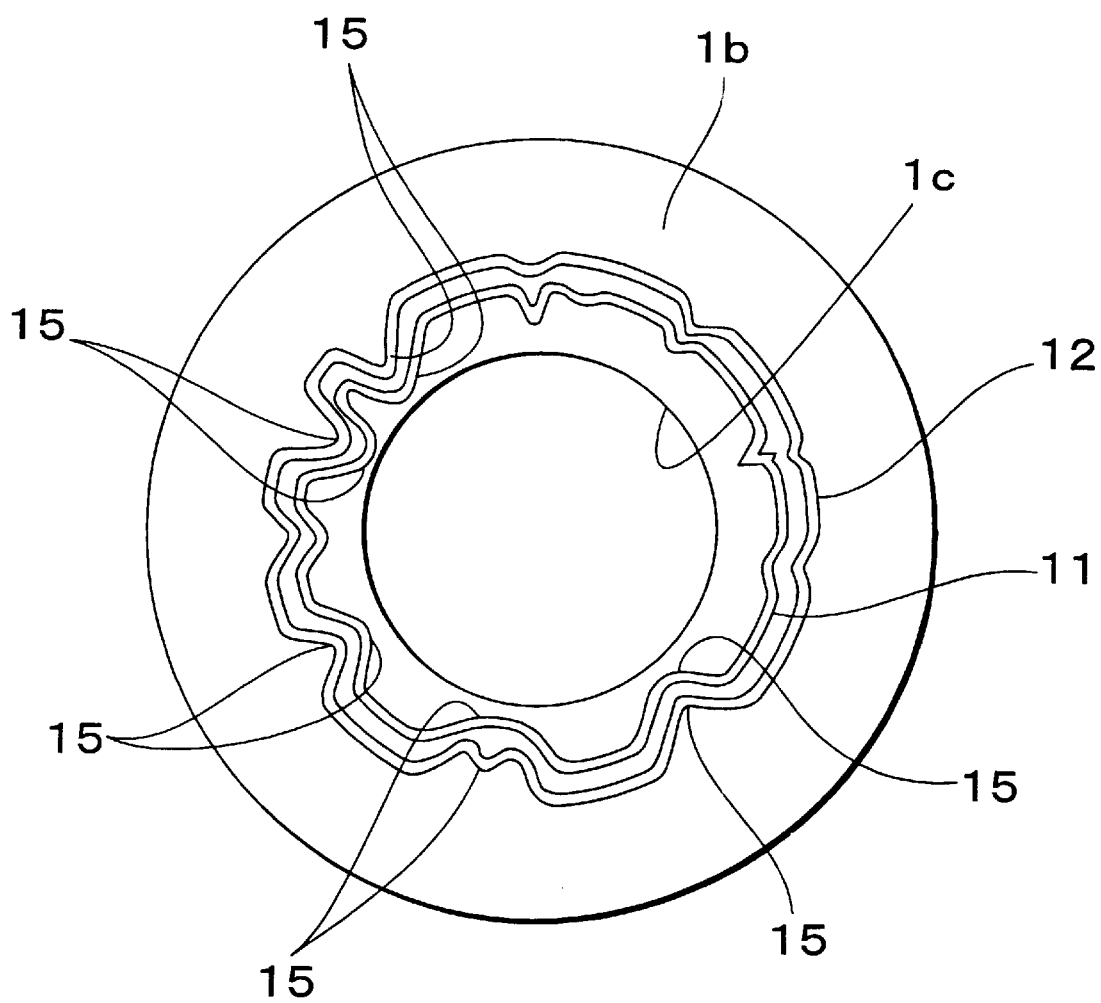
FIG. 8 is a side view of the double-pipe-structure member shown in FIG. 7.
Figure 9:
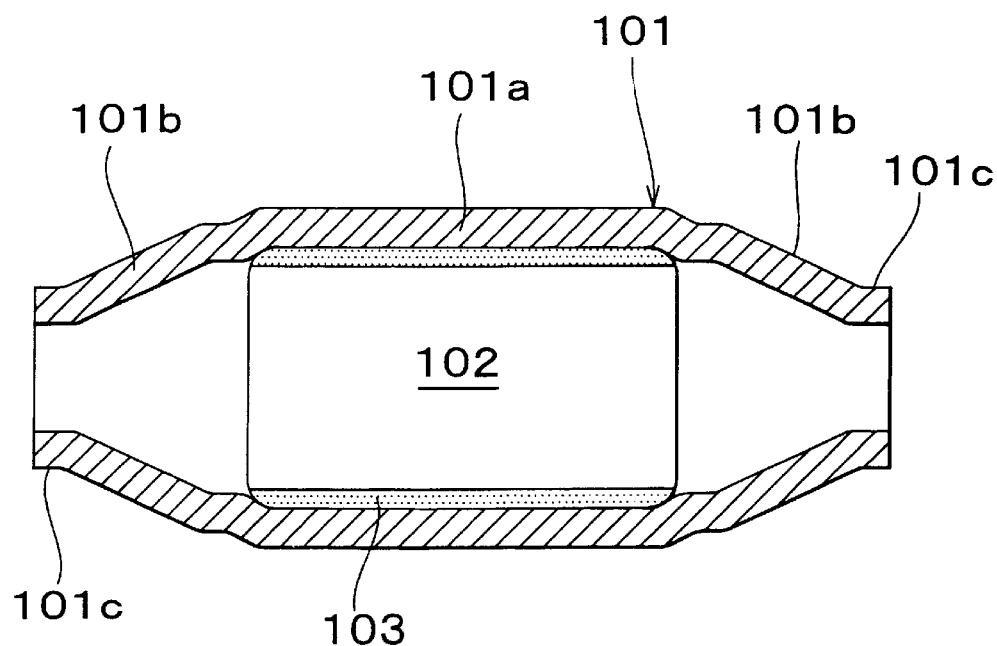
FIG. 9 is a cross-sectional view of a single-pipe-structure hollow member according to the related art.
Figure 10:
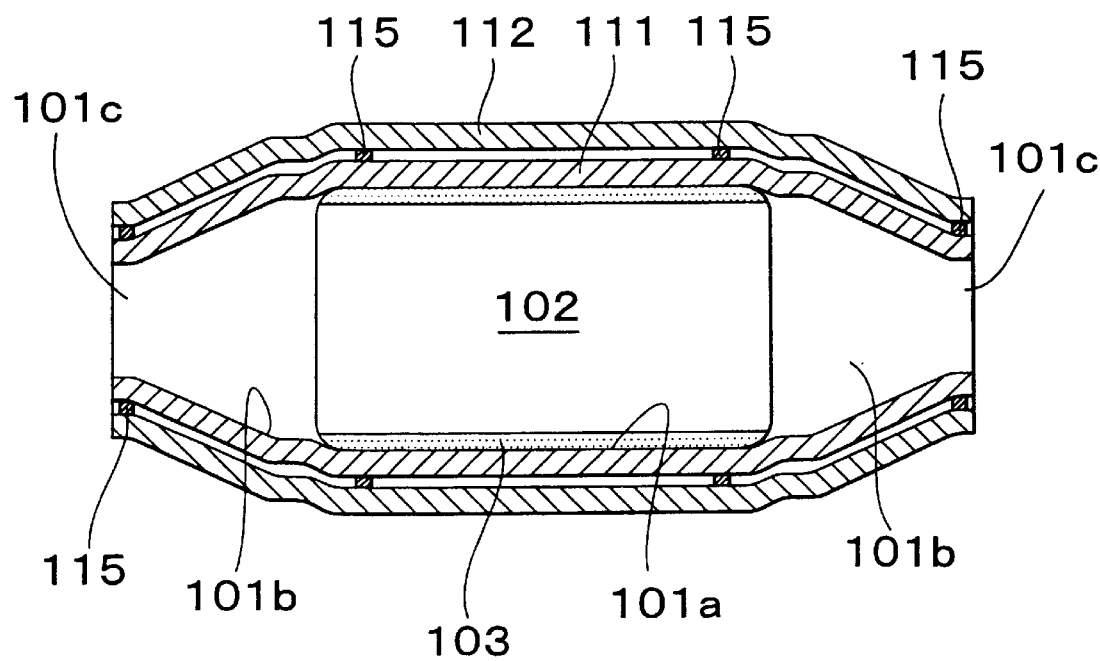
FIG. 10 is a cross-sectional view of a double-pipe-structure hollow member according to the related art.

By being reduced in diameter to the axially middle positions (F), (J) that are slightly closer to the end than the cut-off position P, free ends of the inner and outer pipes 11, 12 gripped by the chuck 21 are left with a diameter larger than that of the connecting portion 1c as shown in FIGS. 7, 8. Therefore, the ribs 15 are formed in such a manner as to be buckled circumferentially and extend axially. Thus, even in the case where the inner and outer pipes 11, 12 are thin, the ribs 15 formed at the position closer to the free ends than the cone portion 1b and the connecting portion 1c that are relatively small in diameter provide the inner and outer pipes 11, 12 with rigidity. Thus, when the inner and outer pipes 11, 12 are reduced in diameter to form the small-diameter portions 1b, 1c, deflection resulting from a pressing force of the forming roller 20 is suppressed. Therefore, those portions of the inner and outer pipes 11, 12 which are formed into the cone portions 1b and the connecting portions 1c are prevented from being undulated or cracked by axial drift. Spinning can be performed stably and reliably until those portions are reduced into a desired diameter.

Note that the double-pipe-structure hollow member manufactured according to the invention is applicable not only to the catalyst container 1 of a catalytic converter in an exhaust system of a combustion system such as an internal combustion engine, but also to an intake system for removing noxious gas from air-containing fuel gas in advance. Further, this double-pipe-structure hollow member is also applicable to a hollow member through which hot fluid flows, such as a flue tube of a combustion system other than the internal combustion engine.

Further, in the case where the double-pipe-structure hollow member of the invention is employed in a catalytic converter as in the case of the above embodiments, the inner pipe 11 may be made e.g. from a temperature- and corrosion-resistant material and the outer pipe 12 may be made e.g. from a weather-resistant material, i.e., a material resistant to rain water. That is, the inner and outer pipes 11, 12 may be made from different materials depending on purpose. Stainless is an example of the temperature- and corrosion-resistant material or the weather-resistant material. To be more specific, stainless such as SUS 409, SUS 425 or SUS 431 can be used. These are suitably selected depending on purpose and adopted to form the inner and outer pipes. Although both the inner and outer pipes 11, 12 have a thickness of e.g. 0.5 mm in the above embodiments, they may be different in thickness. For instance, the inner pipe 11 may have a thickness of 0.6 mm, and the outer pipe 12 may have a thickness of 0.4 mm. However, these values do not limit the scope of the invention. Because of a simple construction wherein the inner and outer pipes 11, 12 are substantially coherently superposed on each other, although the double-pipe-structure hollow member of the invention is smaller in thickness than the single-pipe-structure hollow member of the related art or a double-pipe-structure hollow member with an air gap, it demonstrates the same or even higher rigidity and vibration suppressing performance. Thus, the double-pipe-structure hollow member of the invention can be reduced in weight as a whole and can be formed easily and reliably. This is the significance of the invention. Further, since the invention adopts a construction wherein the inner and outer pipes 11, 12 are superposed on each other, the inner and outer pipes 11, 12 can be spun simultaneously without the necessity to provide a solid interjacent medium as is the case with the related art.

Furthermore, according to the invention, the holes 13 are formed in one of the inner and outer pipes 11, 12 before they are spun. Once the inner and outer pipes 11, 12 have been spun, the holes 13 are diminutively deformed into such a size that allows air to flow between the inner and outer pipes 11, 12. Thus, the fluid flowing inside does not unexpectedly flow into the gap between the inner and outer pipes 11, 12. Also, the double-pipe-structure hollow member can be prevented from being deformed or damaged due to expansion or contraction of the air between the inner and outer pipes 11, 12 resulting from the heat of the fluid flowing inside.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A double-pipe-structure hollow member comprising:

an inner pipe formed as a hollow pipe;

an outer pipe formed as a hollow pipe and disposed concentrically on an outer peripheral side of the inner pipe, wherein an outer periphery of the inner pipe and an inner periphery of the outer pipe are fittingly superposed;

each of the inner pipe and the outer pipe includes a cone shaped portion, the cone shaped portion of the inner pipe and the cone shaped portion of the outer pipe being fittingly superposed in contact with each other;

one of the cone portion of the inner pipe and the cone portion of the outer pipe defines holes through which fluid can flow between the inner and outer pipes; and each of the inner pipe and the outer pipe includes a central portion, an outer periphery of the central portion of the inner pipe being spaced from an inner periphery of the central portion of the inner pipe.

2. The double-pipe-structure hollow member according to claim 1, wherein axial ends of the double-pipe-structure hollow member are smaller in diameter than an axially central portion thereof.

3. The double-pipe-structure hollow member according to claim 2, wherein the axial ends or near-axial ends of the double-pipe-structure hollow member are in the shape of a cone with a diameter decreasing toward the axial ends.

4. The double-pipe-structure hollow member according to claim 1, wherein axial ends of the double-pipe-structure hollow member are smaller in diameter than an axially central portion thereof.

5. The double-pipe-structure hollow member according to claim 4, wherein the axial ends or near-axial ends of the double-pipe-structure hollow member are in the shape of a cone with a diameter decreasing toward the axial ends.

6. The double-pipe-structure hollow member according to claim 1, wherein the inner pipe is made from a temperature- and corrosion-resistant material and the outer pipe is made from a weather-resistant material.

7. A fluid treating system comprising:

a fluid treating member for treating fluid; and a fluid-treating-member container constructed of a double-pipe-structure hollow member composed of an inner pipe and an outer pipe to contain the fluid treating member, wherein:

the inner and outer pipes of the fluid-treating-member container are concentrically disposed and superposed on each other;

each of the inner pipe and the outer pipe includes a cone shaped portion, the cone shaped portion of the inner pipe and the cone shaped portion of the outer pipe being fittingly superposed in contact with each other;

one of the cone portion of the inner pipe and the cone portion of the outer pipe defines holes through which fluid can flow between the inner and outer pipes; and each of the inner pipe and the outer pipe includes a central portion, an outer periphery of the central portion of the inner pipe being spaced from an inner periphery of the central portion of the inner pipe.

8. The fluid treating system according to claim 7, wherein axial ends of the double-pipe-structure hollow member are smaller in diameter than an axially central portion thereof.

9. The fluid treating system according to claim 8, wherein the axial ends or near-axial ends of the double-pipe-structure hollow member are in the shape of a cone with a diameter decreasing toward the axial ends.

* * * * *